(12) United States Patent
Yamada et al.

(10) Patent No.: US 12,444,795 B2
(45) Date of Patent: Oct. 14, 2025

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Masahiro Yamada, Kariya (JP); Hiromi Ueda, Kariya (JP); Satoshi Morioka, Okazaki (JP); Motoyoshi Okumura, Nagoya (JP); Takuro Kikuchi, Tokyo (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 932 days.

(21) Appl. No.: 17/415,299

(22) PCT Filed: Dec. 20, 2019

(86) PCT No.: PCT/JP2019/050214
§ 371 (c)(1),
(2) Date: Jun. 17, 2021

(87) PCT Pub. No.: WO2020/137923
PCT Pub. Date: Jul. 2, 2020

(65) Prior Publication Data
US 2022/0069395 A1 Mar. 3, 2022

(30) Foreign Application Priority Data
Dec. 25, 2018 (JP) .................................. 2018-241143

(51) Int. Cl.
*H01M 50/184* (2021.01)
*H01G 11/12* (2013.01)
(Continued)

(52) U.S. Cl.
CPC .......... *H01M 50/184* (2021.01); *H01G 11/12* (2013.01); *H01G 11/80* (2013.01);
(Continued)

(58) Field of Classification Search
CPC ........... H01M 10/0486; H01M 10/044; H01M 10/0418; H01M 10/0463; H01M 10/613;
(Continued)

(56) References Cited

U.S. PATENT DOCUMENTS 5,658,690 A * 8/1997 Lund ..................... H01M 10/18
429/234
2004/0253512 A1 12/2004 Watanabe et al.
(Continued)

FOREIGN PATENT DOCUMENTS

JP 2005-005163 A 1/2005
JP 2005259379 A * 9/2005
(Continued)

OTHER PUBLICATIONS

Machine translation of Japanese Patent Publication No. JP 2005-259379, published Sep. 22, 2005. (Year: 2005).*
(Continued)

*Primary Examiner* — Miriam Stagg
*Assistant Examiner* — Lilia Nedialkova
(74) *Attorney, Agent, or Firm* — Sughrue Mion, PLLC

(57) ABSTRACT

A power storage device includes a plurality of power storage modules laminated in a first direction via a conductive plate. A plurality of power storage modules include a plurality of laminates including each of the plurality of laminated electrodes, and a sealed body provided on each side surface of a plurality of laminates. The plurality of laminates are restrained in the first direction by a restraining member in a state of being laminated via the conductive plate. The sealed body includes a main body portion covering each side
(Continued)

surface of the plurality of laminates, protruding portions protruding in the width direction intersecting the first direction with end portions of the main body portion as base ends, and at least one deformation suppressing portion protruding from the protruding portion in the first direction and forming a protruding shape.

7 Claims, 8 Drawing Sheets

(51) Int. Cl.
| | |
|---|---|
| *H01G 11/80* | (2013.01) |
| *H01M 50/176* | (2021.01) |
| *H01M 50/186* | (2021.01) |
| *H01M 50/209* | (2021.01) |
| *H01M 50/227* | (2021.01) |
| *H01M 50/50* | (2021.01) |

(52) U.S. Cl.
CPC ....... *H01M 50/176* (2021.01); *H01M 50/186* (2021.01); *H01M 50/209* (2021.01); *H01M 50/227* (2021.01); *H01M 50/50* (2021.01)

(58) Field of Classification Search
CPC ........... H01M 10/625; H01M 10/6551; H01M 10/6554–6557; H01M 8/1004; H01M 8/2465; H01M 8/249; H01M 50/103; H01M 50/176; H01M 50/184; H01M 50/186; H01M 50/209; H01M 50/227; H01M 50/249
See application file for complete search history.

(56) References Cited

U.S. PATENT DOCUMENTS

| | | | |
|---|---|---|---|
| 2006/0286450 A1* | 12/2006 | Yoon ................. | H01M 10/0431 |
| | | | 429/180 |
| 2014/0154602 A1* | 6/2014 | Michelitsch ........ | H01M 8/0258 |
| | | | 429/432 |
| 2016/0072112 A1* | 3/2016 | Smith ................... | H01M 50/51 |
| | | | 429/93 |

FOREIGN PATENT DOCUMENTS

| | | |
|---|---|---|
| JP | 2019-204669 A | 11/2019 |
| WO | 2007/082863 A1 | 7/2007 |
| WO | 2018/142919 A1 | 8/2018 |

OTHER PUBLICATIONS

International Search Report for PCT/JP2019/050214 dated, Mar. 24, 2020 (PCT/ISA/210).
Communication dated Dec. 12, 2022, issued in Indian Application No. 202117029641.
International Preliminary Report on Patentability with translation of Written Opinion dated Jun. 16, 2021, in International Application No. PCT/JP2019/050214.

* cited by examiner

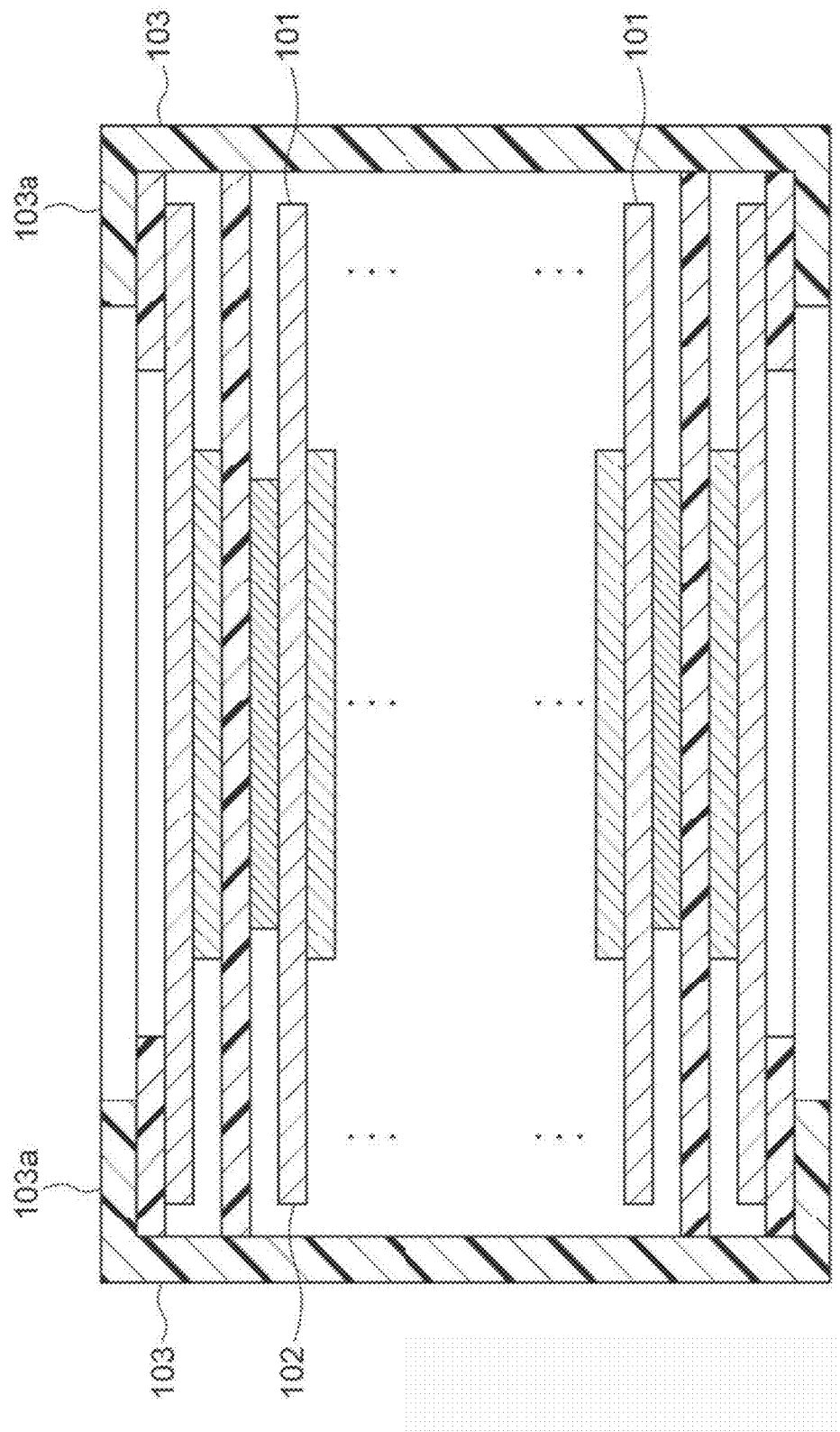
Fig.7 --PRIOR ART--

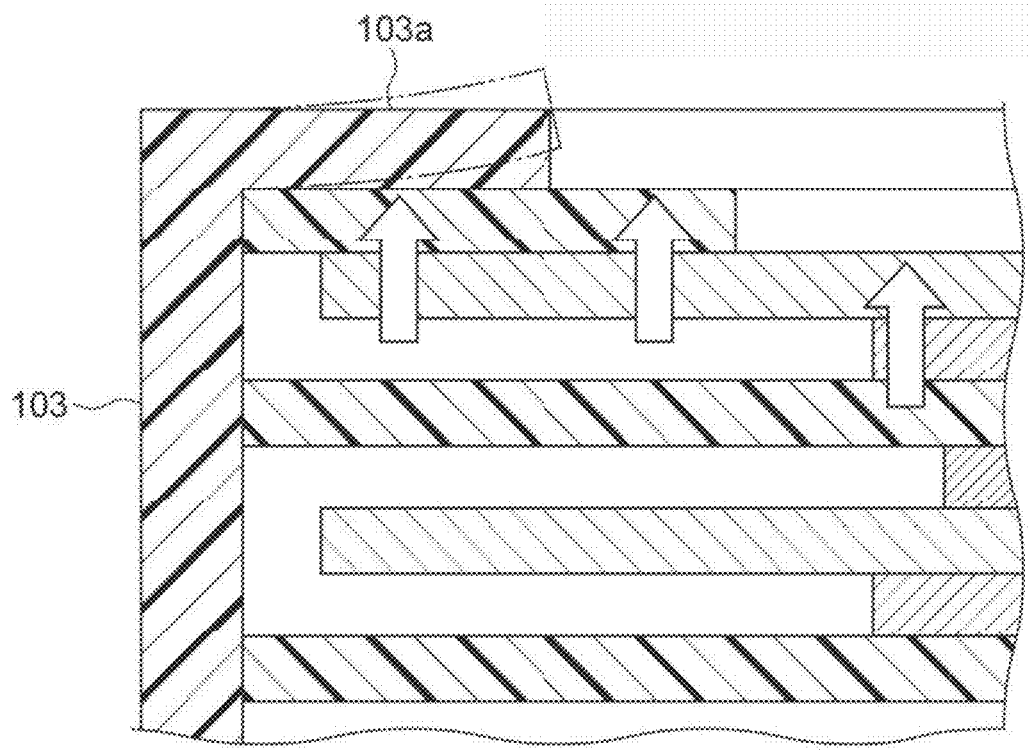
Fig.8 -- PRIOR ART --

POWER STORAGE DEVICE

CROSS REFERENCE TO RELATED APPLICATIONS

This application is a National Stage of International Application No. PCT/JP2019/050214 filed Dec. 20, 2019, claiming priority based on Japanese Patent Application No. 2018-241143 filed Dec. 25, 2018.

TECHNICAL FIELD

One aspect of the present disclosure relates to a power storage device.

BACKGROUND ART

Patent Literature 1 discloses a power storage device. The power storage device has a plurality of power storage modules connected to each other via a conductive plate. The power storage module includes a laminate in which a plurality of bipolar electrodes are laminated. A side portion of the laminate is sealed with resin.

CITATION LIST

Patent Literature

[Patent Literature 1] Japanese Unexamined Patent Publication No. 2005-5163

SUMMARY OF INVENTION

Technical Problem

In such a power storage device, as shown in FIG. 7, it is conceivable that, in the power storage module, a side portion of a laminate 102 in which bipolar electrodes 101 are laminated is sealed by a sealed body 103, and an end portion of the sealed body 103 is bent inward to form a protruding portion 103a. By extending the protruding portion 103a inside the laminate 102, the extension of the end portion of the laminate 102 can be suppressed. However, an internal pressure of the power storage module may increase when the power storage device is used. In this case, as shown in FIG. 8, an internal pressure is applied to the protruding portion 103a of the sealed body 103, and the sealed body 103, which is a part of the power storage module, may be deformed.

Therefore, an object of the present disclosure is to provide a power storage device capable of suppressing deformation of the power storage module.

Solution to Problem

A power storage device according to one aspect of the present disclosure includes a plurality of power storage modules laminated in a first direction via a conductive plate, in which each of the plurality of power storage modules includes a laminate including a plurality of electrodes laminated in the first direction, and a sealed body provided on a side surface of the laminate extending in the first direction, the laminate constituting the power storage module has electrode exposure portions each exposed from the sealed body, in a state of being laminated by disposing the conductive plate on the electrode exposure portion, the laminate and the conductive plate are restrained in the first direction by a restraining member, and the sealed body includes a main body portion covering the side surface of the laminate, protruding portions protruding in a width direction intersecting the first direction with end portions of the main body portion in the first direction as base ends and covering peripheral edges of an upper surface and a bottom surface of the laminate, and at least one deformation suppressing portion protruding from the protruding portion in the first direction.

In the power storage device according to one aspect, the strength of the protruding portion can be increased at a position where the deformation suppressing portion is formed. As a result, the deformation of the protruding portion is suppressed, so that the deformation of the power storage module can be suppressed.

In addition, the at least one deformation suppressing portion may be formed from one end to the other end of the protruding portion in the width direction. In the configuration, the strength of the protruding portion can be increased at a position extending from one end to the other end of the protruding portion. As a result, the deformation of the protruding portion is further suppressed.

In addition, the at least one deformation suppressing portion may be formed on a distal end side of the protruding portion in the width direction. In the configuration, the increase in the weight of the power storage module can be suppressed by reducing the amount of a material of the sealed body.

In addition, the protruding portions may have a rectangular frame shape when viewed from the first direction, the at least one deformation suppressing portions may be a plurality of deformation suppressing portions, and on at least one side of the protruding portions constituting the rectangular frame shape, the plurality of deformation suppressing portions may be disposed apart from each other in a direction along the side. In the configuration, the increase in the weight of the power storage module can be suppressed by reducing the amount of a material of the sealed body.

In addition, the conductive plate may include a through hole formed in a second direction intersecting the first direction, the at least one deformation suppressing portion may be continuously formed from one end side to the other end side in the second direction on a side of the protruding portion extending along the second direction, and a plurality of the deformation suppressing portions may be disposed apart from each other in a third direction intersecting the first direction and the second direction on a side of the protruding portion extending along the third direction. Since the deformation suppressing portion is continuously formed in the direction along the through hole, the deformation of the protruding portion can be suppressed more reliably. Further, the deformation suppressing portion is disposed apart from each other in the direction intersecting the through hole. Therefore, even when the deformation suppressing portions adjacent to each other in the first direction abut each other, the through hole is prevented from being completely blocked by the deformation suppressing portion.

In addition, when at least one of a plurality of the laminates is expanded by use, the at least one deformation suppressing portion of the at least one of the expanded laminates may abut on the protruding portion of the sealed body adjacent in the first direction. For example, when the power storage device is used, due to an increase in an internal pressure of the laminate, the protruding portions of the adjacent sealed bodies can be deformed to approach each other. When the protruding portions approach each other, the deformation suppressing portion of one protruding portion and the adjacent protruding portion of the other protruding portion are in a state of pressing each other. As a result, the deformation of the protruding portion is suppressed. That is, the deformation of the power storage module is suppressed.

Effects of Invention

According to one aspect of the present disclosure, it is possible to provide a power storage device capable of suppressing deformation of the power storage module.

BRIEF DESCRIPTION OF DRAWINGS

FIG. 7 is an explanatory diagram of background technology.

FIG. 8 is an explanatory diagram of background technology.

DESCRIPTION OF EMBODIMENTS

Figure 1:
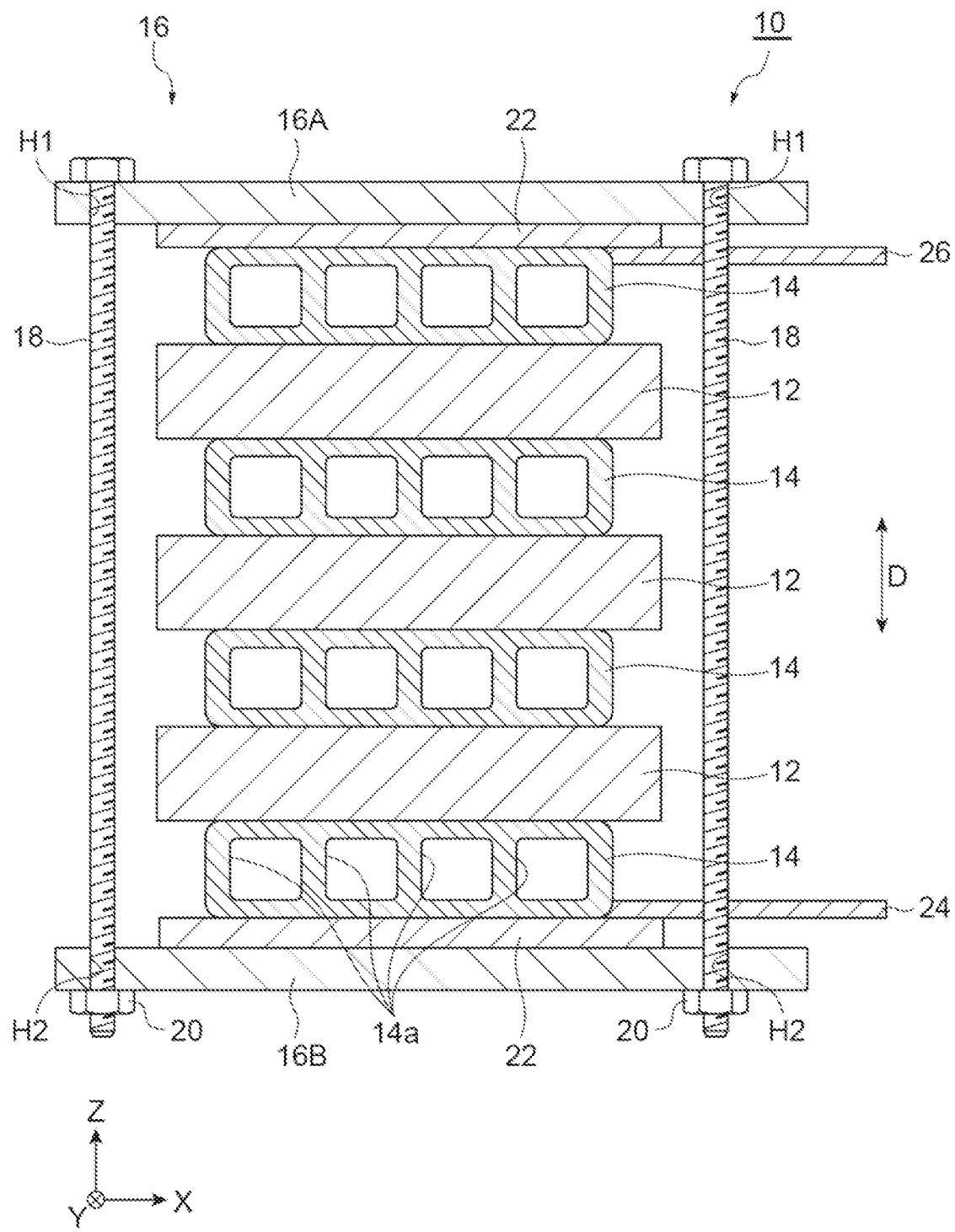
FIG. 1 is a schematic cross-sectional view showing an example of a power storage device.

Hereinafter, an example power storage device will be described in detail with reference to the attached drawings. In the explanation of the drawings, the same reference numerals are used for the same or equivalent elements, and duplicate description is omitted. In the explanation, an XYZ rectangular coordinate system shown in the drawings may be referred to. As an example, an XY plane is a horizontal plane, and a Z direction is a vertical direction. In addition, unless otherwise specified, "width" means a length in the XY plane, and "height" means a length in the Z direction.

FIG. 1 is a schematic cross-sectional view showing an example of a power storage device including a power storage module. A power storage device 10 shown in FIG. 1 is used as a battery for various vehicles such as forklifts, hybrid vehicles, and electric vehicles. Although the power storage device 10 includes a plurality of (three in the shown example) power storage modules 12, but may include a single power storage module 12. The power storage module 12 is, for example, a bipolar battery. The power storage module 12 is a secondary battery such as a nickel hydrogen secondary battery or a lithium ion secondary battery, but may be an electric double layer capacitor. In the following explanation, a nickel hydrogen secondary battery will be exemplified.

The plurality of power storage modules 12 can be laminated via a conductive plate 14 made of a conductive material such as a conductive resin plate or a metal plate. In the present embodiment, the power storage module 12 and the conductive plate 14 have, for example, a rectangular shape when viewed from a laminating direction (first direction) D. Details of each power storage module 12 will be described later. Each of the conductive plates 14 is also disposed on the outside of the power storage modules 12 located at both ends in the laminating direction D of the power storage modules 12. The conductive plate 14 is electrically connected to the adjacent power storage modules 12. As a result, a plurality of power storage modules 12 are connected in series in the laminating direction D. In the laminating direction D, a positive electrode terminal 24 is connected to the conductive plate 14 located at one end, and a negative electrode terminal 26 is connected to the conductive plate 14 located at the other end. The positive electrode terminal 24 may be integrated with the conductive plate 14 to be connected. The negative electrode terminal may be integrated with the conductive plate 14 to be connected. The positive electrode terminal 24 and the negative electrode terminal 26 extend in a direction (X direction) intersecting the laminating direction D. The positive electrode terminal 24 and the negative electrode terminal 26 can be used to charge and discharge the power storage device 10.

The conductive plate 14 can also function as a heat radiating plate for releasing heat generated in the power storage module 12. The conductive plate 14 may be provided with a plurality of through holes 14a as cooling flow paths through which the cooling fluid passes. Each through hole 14a extends in a direction (Y direction) intersecting the laminating direction D, for example. In one example, the conductive plate 14 is formed smaller than the power storage module 12 when viewed from the laminating direction D.

The power storage device 10 may include a restraining member 16 that restrains the power storage modules 12 and the conductive plates 14, which are alternately laminated, in the laminating direction D. The restraining member 16 includes a pair of restraining plates 16A and 16B and connecting members (bolts 18 and nuts 20) that connect the restraining plates 16A and 16B to each other. Each of the restraining plates 16A and 16B can be made of, for example, a highly rigid metal plate such as iron or aluminum. When each of the restraining plates 16A and 16B is made of a metal plate, an insulating member 22 having an insulating property such as an insulating resin film or an insulating resin plate may be disposed between each of the restraining plates 16A and 16B and the conductive plate 14. Each of the restraining plates 16A and 16B and the insulating member 22 have, for example, a rectangular shape when viewed from the laminating direction D. The insulating member 22 is formed to be larger than the conductive plate 14 when viewed from the laminating direction D, and the restraining plates 16A and 16B are formed to be larger than the power storage module 12 when viewed from laminating direction D. An insertion hole H1 through which a shaft portion of the bolt 18 is inserted is provided at a position outside the power storage module 12 at an edge portion of the restraining plate 16A when viewed from the laminating direction D. Similarly, an insertion hole H2 through which a shaft portion of the bolt 18 is inserted is provided at a position outside the power storage module 12 at an edge portion of the restraining plate 16B when viewed from the laminating direction D. In order to adjust a distance between the pair of restraining plates 161 and 16B, a bolt collar through which the bolt 18 is inserted may be provided between the restraining plate 16A and the restraining plate 16B.

One restraining plate 16A is abutted on the conductive plate 14 connected to the negative electrode terminal 26 via the insulating member 22, and the other restraining plate 16B is abutted on the conductive plate 14 connected to the positive electrode terminal 24 via the insulating member 22. For example, the bolt 18 is passed through the insertion hole H1 from one restraining plate 16A side toward the other restraining plate 16B side, and the nut 20 is screwed to a distal end of the bolt 18 protruding from the other restraining plate 16B. As a result, the insulating member 22, the conductive plate 14, and the power storage module 12 are sandwiched and unitized by the pair of restraining plates 16A and 16B, and a restraining load is applied to the power storage module 12 along the laminating direction D.

Figure 2:
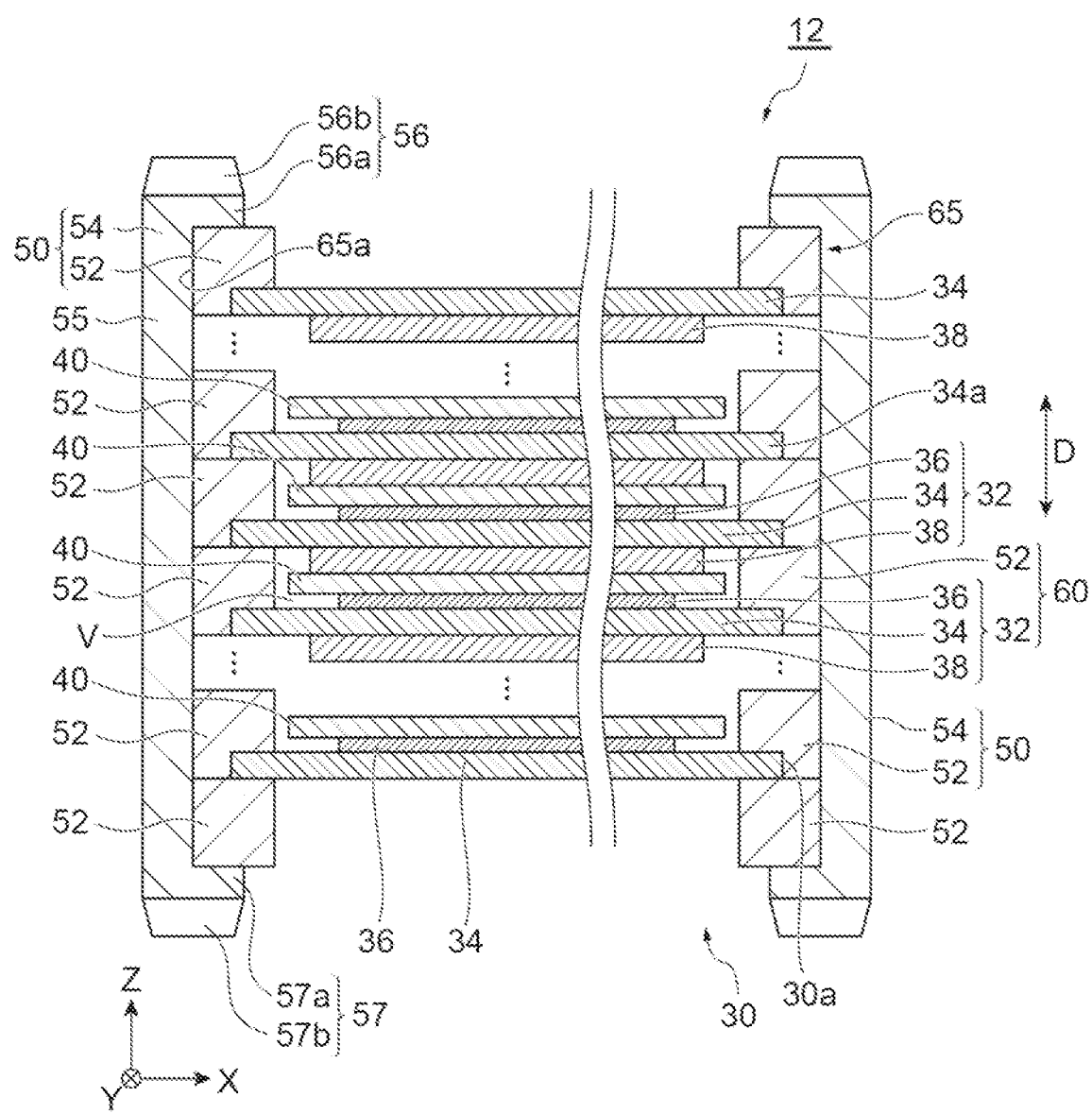
FIG. 2 is a schematic cross-sectional view showing a power storage module constituting the power storage device of FIG. 1.

FIG. 2 is a schematic cross-sectional view showing a power storage module constituting the power storage device of FIG. 1. The power storage module 12 includes an electrode laminate 30 in which a plurality of bipolar electrodes (electrodes) 32 are laminated. The electrode laminate 30 has, for example, a rectangular shape when viewed from the laminating direction D of the bipolar electrodes 32. A separator 40 may be disposed between adjacent bipolar electrodes 32. The bipolar electrode 32 includes an electrode plate 34, a positive electrode 36 provided on one surface of the electrode plate 34, and a negative electrode 38 provided on the other surface of the electrode plate 34. In the electrode laminate 30, the positive electrode 36 of one bipolar electrode 32 is faced to the negative electrode 38 of one bipolar electrode 32 adjacent to the laminating direction D across the separator 40, and the negative electrode 38 of one bipolar electrode 32 is faced to the positive electrode 36 of the other bipolar electrode 32 adjacent to the laminating direction D across the separator 40.

In the laminating direction D, at one end of the electrode laminate 30, an electrode plate 34 (negative electrode side terminal electrode) in which the negative electrode 38 is disposed on the inside surface is disposed, and at the other end of the electrode laminate 30, the electrode plate 34 (positive electrode side terminal electrode) in which the positive electrode 36 is disposed on the inside surface is disposed. The negative electrode 38 of the negative electrode side terminal electrode faces the positive electrode 36 of the uppermost bipolar electrode 32 via the separator 40. The positive electrode 36 of the positive electrode side terminal electrode faces the negative electrode 38 of the lowermost bipolar electrode 32 via the separator 40. The electrode plate 34 of these terminal electrodes is an electrode exposure portion exposed from a frame body 50 described later, and is connected to adjacent conductive plates 14 (refer to FIG. 1). In the electrode laminate 30, an uncoated metal plate may be laminated on the further outer side of the outermost electrode plate 34 in the laminating direction.

The power storage module 12 includes a frame body 50 that holds the electrode plate 34 and a peripheral edge 34*a* of the uncoated metal plate on a side surface 30*a* of the electrode laminate 30 extending in the laminating direction D. The frame body 50 is provided around the electrode laminate 30 when viewed from the laminating direction D. That is, the frame body 50 is configured to surround the side surface 30*a* of the electrode laminate 30. The frame body 50 may include a first resin portion 52 that holds the peripheral edge 34*a* of the electrode plate 34, and a second resin portion (sealed body) 54 provided around the first resin portion 52 when viewed from the laminating, direction D.

In each bipolar electrode 32, the first resin portion 52 forming the inner wall of the frame body 50 is welded to one surface (for example, a surface on which the positive electrode 36 is formed) of the peripheral edge 34*a* of the electrode plate 34, and the first resin portion 52 thereof is provided from one surface of the electrode plate 34 to the end surface of the electrode plate 34 on the peripheral edge 34*a*. In a negative electrode terminal electrode, the first resin portion 52 forming the inner wall of the frame body 50 is welded to one surface (for example, a surface of the power storage module 12 facing the outside) of the peripheral edge 34*a* of the electrode plate 34, and the first resin portion 52 thereof is provided from one surface of the electrode plate 34 to the end surface of the electrode plate 34 on the peripheral edge 34*a*. In the positive electrode side terminal electrode, the first resin portion 52 forming the inner wall of the frame body 50 is welded on both surfaces of the peripheral edge 34*a* of the electrode plate 34. In one example, an electrode unit 60 is configured by welding the first resin portion 52 to the peripheral edge of the bipolar electrode 32. When viewed from the laminating, direction D, each first resin portion 52 is provided over the entire circumference of the peripheral edge 34*a* of the electrode plate 34 of each bipolar electrode 32. The first resin portion 52 joined to each electrode plate 34 extends outward from the end portion of the electrode plate 34, and the adjacent first resin portions 52 are welded to each other at a portion extending outward from the electrode plate 34. As a result, the peripheral edge 34*a* of the electrode plate 34 of each bipolar electrode 32 is held in the first resin portion 52 in a buried state. Similar to the peripheral edge 34*a* of the electrode plate 34 of each bipolar electrode 32, the peripheral edge 34*a* of the electrode plate 34 between the positive electrode terminal electrode and the negative electrode terminal electrode disposed at both ends of the electrode laminate 30 is also held in a state buried in the first resin portion 52. As a result, an internal space V partitioned by the electrode plates 34 and the first resin portion 52 is formed between the electrode plates 34 adjacent to each other in the laminating direction D. The internal space V contains an electrolyte (not shown) made of an alkali solution such as an aqueous solution of potassium hydroxide.

The second resin portion 54 constituting an outer wall of the frame body 50 is a tubular body extending in the shaft direction in the laminating direction D. The second resin portion 54 extends over the entire length of the electrode laminate 30 in the laminating direction D. The second resin portion 54 covers the outer surface of the first resin portion 52 extending in the laminating direction D. The second resin portion 54 is welded to the first resin portion 52 inside when viewed from the laminating direction D.

As the electrode plate 34, for example, a rectangular metal foil made of nickel foil, nickel-plated steel foil, stainless steel foil, or the like can be used. The peripheral edge 34*a* of the electrode plate 34 is an uncoated region in which a positive electrode active material and a negative electrode active material are not coated, and the uncoated region is a region to be held by being buried in the first resin portion 52 constituting the inner wall of the frame body 50. Examples of the positive electrode active material constituting the positive electrode 36 include nickel hydroxide. Examples of the negative electrode active material constituting the negative electrode 38 include a hydrogen storage alloy. A formation region of the negative electrode 38 on the other surface of the electrode plate 34 is one size larger than the formation region of the positive electrode 36 on one surface of the electrode plate 34.

The separator 40 is formed in a sheet shape, for example. Examples of the material for forming the separator 40 include a porous film made of a polyolefin resin such as polyethylene (PE) and polypropylene (PP), a woven fabric made of polypropylene or the like, of a non-woven fabric. In addition, the separator 40 may be reinforced with a vinylidene fluoride resin compound or the like. Examples of the resin material constituting the frame body 50 include polypropylene (PP), polyphenylene sulfide (PPS), modified polyphenylene ether (modified PPE), and the like. In one example, the laminate 65 is configured by a plurality of electrode units 60 laminated via the separator 40.

Figure 3:
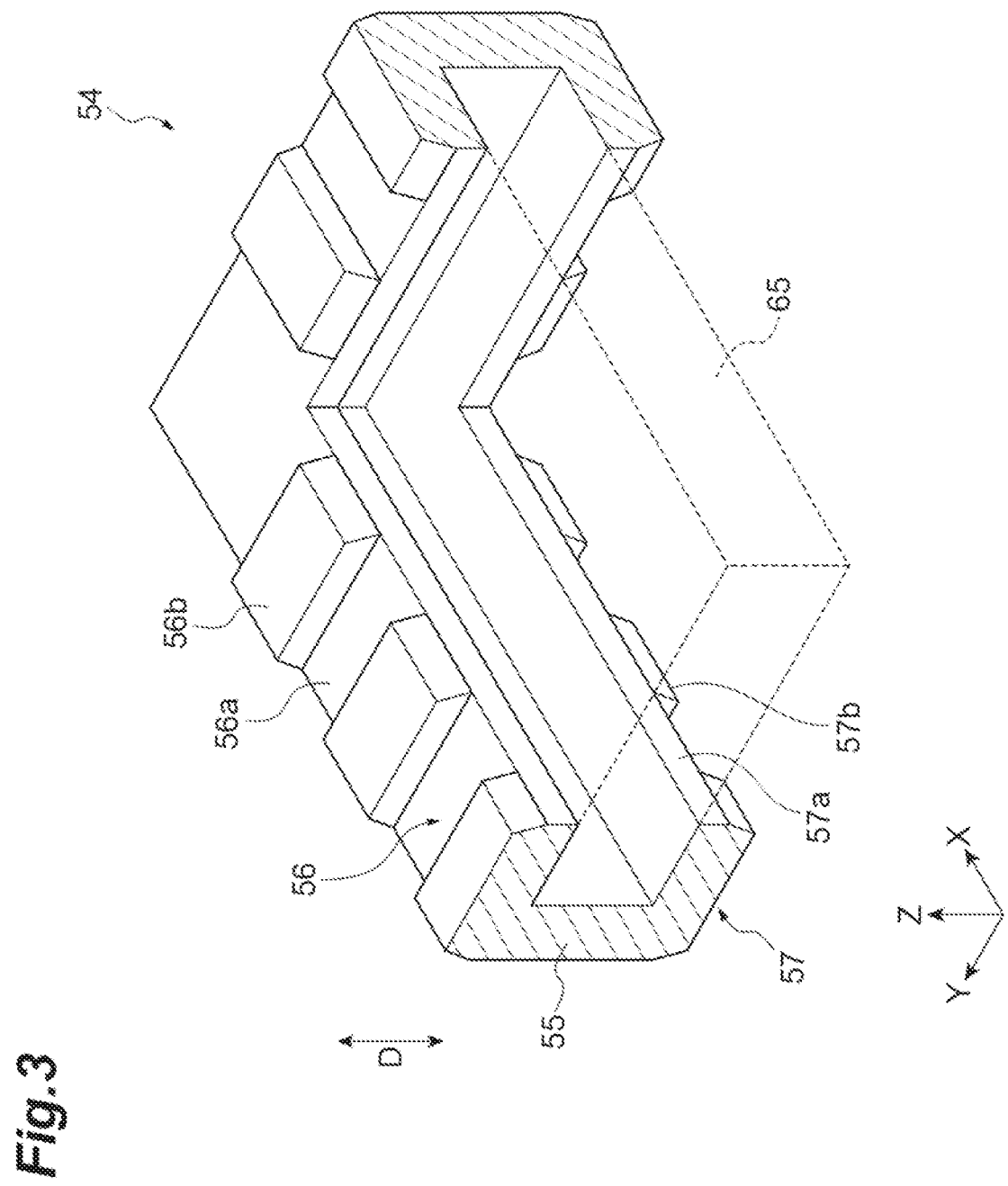
FIG. 3 is a cross-sectional perspective view explaining a sealed body.
Figure 4:
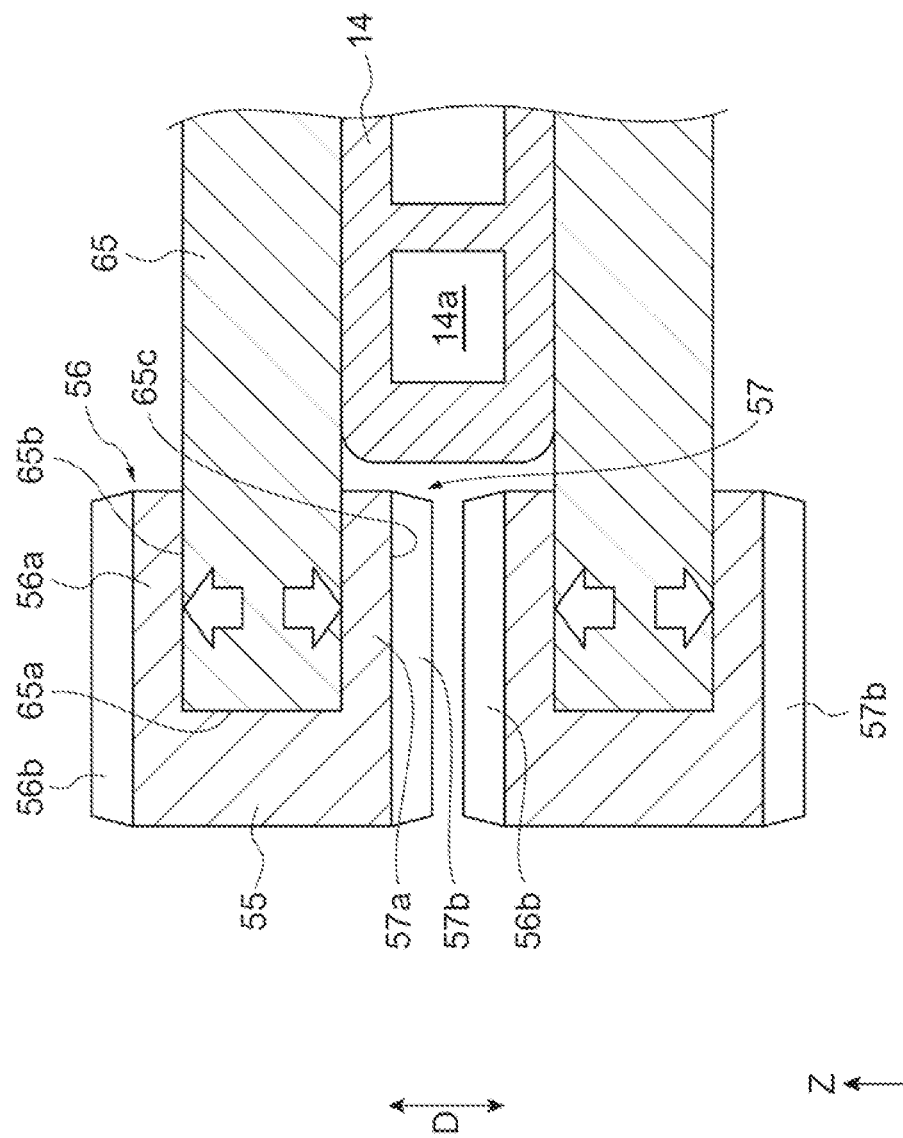
FIG. 4 is a schematic cross-sectional view showing a relationship between adjacent power storage modules.

The second resin portion 54 will be described in more detail. FIG. 3 is a cross-sectional perspective view explaining the second resin portion 54. FIG. 4 is a schematic cross-sectional view showing a relationship between adjacent power storage modules 12. In FIG. only the second resin portion 54 constituting the power storage module 12 is drawn. In one example, the second resin portion 54 is formed by injection molding on the outer periphery (side surface) of the first resin portion 52 of the laminate 65. Therefore, the first resin portion 52 and the second resin portion 54 can be compatible with each other.

As shown in FIG. 3, the second resin portion 54 includes a main body portion 55 and a pair of protruding portions 56 and 57. The main body portion 55 covers the side surface 65a extending along the laminating direction D of the laminate 65. That is, the main body portion 55 includes a portion formed along the side surface 65a of the laminate 65. In one example, the laminate 65 formed in a rectangular shape when viewed from the laminating direction D includes four side surfaces 65a forming the outer periphery of the laminate 65. In one example, the main body portion 55 of the second resin portion 54 covers all the side surfaces 65a of the laminate 65. Therefore, the main body portion 55 has a rectangular frame shape.

The protruding portion 56 includes a protruding main body portion 56a and a deformation suppressing portion 56b. The protruding main body portion 56a protrudes in the width direction (X direction and Y direction in the shown example) intersecting the laminating direction D at an upper end portion of the main body portion 55 in the laminating direction D. The protruding portion 57 includes a protruding main body portion 57a and a deformation suppressing portion 57b. The protruding main body portion 57a protrudes in the width direction intersecting the laminating direction D at a lower end portion of the main body portion 55 in the laminating direction D. In the shown example, the protruding main body portions 56a and 57a extend inward from the main body portion 55 in parallel with the electrode plate 34. The protruding main body portion 56a covers the entire peripheral edge of the upper surface 65b of the laminate 65. The protruding main body portion 57a covers the entire peripheral edge of the bottom surface 65c of the laminate 65. That is, the protruding main body portions 56a and 57a have a rectangular frame shape when viewed from the laminating direction D. The width direction of the protruding main body portions 56a and 57a is a direction in which the sides of the protruding main body portions 56a and 57a forming the rectangular frame shape intersect (orthogonally) in the horizontal plane in the extending direction of the sides.

When the laminate 65 expands due to use, the deformation suppressing portion 56b may abut on the protruding portion 57 of the power storage modules 12 adjacent to each other in the laminating direction D. In the shown example, in a pair of power storage modules 12 adjacent to each other in the laminating direction D, when each of the laminates 65 expands due to use, the deformation suppressing portion 57b of the upper power storage module 12 and the deformation suppressing portion 56b of the lower power storage module 12 abut on each other. That is, when viewed from the laminating direction D, the deformation suppressing portion 57b of the upper power storage module 12 and the deformation suppressing portion 56b of the lower power storage module 12 are formed at positions where they overlap each other. The deformation suppressing portions 56b and 57b disposed to face each other in the laminating direction D may be disposed apart from each other in a state where the laminate 65 is not expanded. A distance between the deformation suppressing portions 56b and 57b facing each other is a distance at which the deformation suppressing portions 56b and 57b can abut each other before the second resin portion 54 is destroyed when the second resin portion 54 is deformed by the expansion of the laminate 65. For example, in order to bring the deformation suppressing portions 56b and 57b to abut each other in a state where the expansion is small, the distance between the deformation suppressing portions 56b and 57b may be reduced.

In one example, a plurality of deformation suppressing portions 56b are disposed on the upper surface of the protruding main body portion 56a to protrude upward. The plurality of deformation suppressing portions 56b are formed from one end to the other end of the protruding main body portion 56a in the width direction. The protruding main body portion 56a formed in a rectangular annular shape when viewed from the laminating direction D has a plurality of deformation suppressing portions 56b disposed apart from each other in the direction along the side on at least one side. In one example, the protruding main body portion 56a formed in a rectangular annular shape when viewed from the laminating direction D may have a plurality of deformation suppressing portions 56b disposed apart from each other in the direction along each side on all four sides. In one example, the protruding main body portion 56a formed in a rectangular annular shape when viewed from the laminating direction D may have one deformation suppressing portion 56b formed on one of the four sides. For example, the deformation suppressing portion 56b may have a shape having a plane along the XY plane such as a weight platform shape or a columnar shape.

In addition, a plurality of deformation suppressing portions 57b are disposed on the lower surface of the protruding main body portion 57a to protrude downward. The plurality of deformation suppressing portions 57b are formed from one end to the other end of the protruding main body portion 57a in the width direction. The plurality of deformation suppressing portions 57b are disposed apart from each other in the direction along the side on at least one side of the protruding main body portion 57a forming a rectangular shape. In the shown example, the plurality of deformation suppressing portions 57b are disposed apart from each other in the direction along the side on all four sides of the protruding main body portion 57a forming a rectangular shape. For example, the deformation suppressing portion 56b may have a shape having a plane along the XY plane such as a weight platform shape or a columnar shape.

In the power storage device 10 described above, the protruding portions of adjacent modules are disposed apart from each other, but when the power storage device 10 is used, the laminate 65 may expand due to an increase in the internal pressure of the laminate 65. For example, in FIG. 4, the direction in which the laminate 65 expands due to the increase in the internal pressure is indicated by a blank arrow Due to the expansion of the laminate 65, the pair of protruding portions 56 and 57 of the second resin portion 54 provided around the laminate 65 can be deformed in a direction separating from each other. In this case, the protruding portions 56 and 57 in the second resin portion 54 adjacent to each other in the laminating direction D come close to each other. Then, when the protruding portions 56 and 57 approach each other, each deformation suppressing portions 56b and 57b abut each other. Since the adjacent laminates 65 are restrained via the conductive plate 14 by the restraining member 16, the deformation suppressing portions 56b and 57b of the adjacent protruding portions 56 and 57 are in a state of pressing each other. As a result, the deformation of the protruding portions 56 and 57 is suppressed. That is, the deformation of the power storage module 12 is suppressed.

In addition, the deformation suppressing portions 56b and 57b are formed from one end to the other end of the protruding portions 56 and 57 in the width direction. In this configuration, the strength of the protruding portions 56 and 57 can be increased at a position where the deformation suppressing portions 56b and 57b are formed. As a result, the deformation of the protruding portions 56 and 57 is further suppressed.

Figure 5:
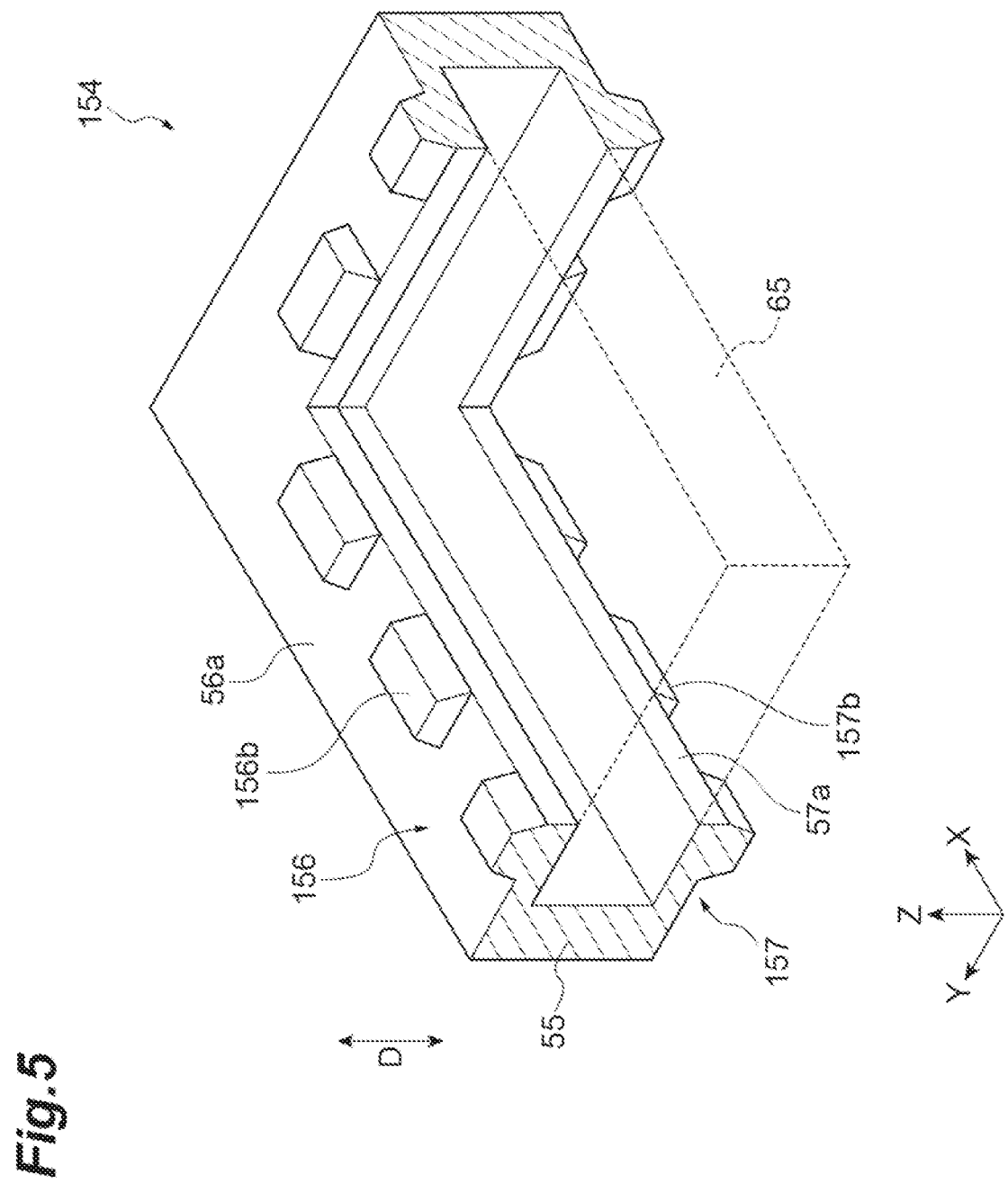
FIG. 5 is a cross-sectional perspective view explaining a sealed body.

As described above, an example of the power storage device has been described in detail with reference to the drawings, but the specific configuration is not limited to the above-described form, For example, FIG. 5 is a cross-sectional perspective view explaining a second resin portion 154 according to another example. The second resin portion 154 shown in FIG. 5 is different from the above-described second resin portion 54 in terms of a shape of the deformation suppressing portion. The second resin portion 154 has the main body portion 55 and protruding portions 156 and 157. The protruding portion 156 has the protruding main body portion 56a and a deformation suppressing portion 156b. The protruding portion 157 has the protruding main body portion 57a and a deformation suppressing portion 157b. The form of the power storage module to which the second resin portion 154 is applied is the same as that of the power storage module 12 described above.

In the present modification example, a plurality of deformation suppressing portions 156b are disposed on the upper surface of the protruding main body portion 56a. The plurality of deformation suppressing portions 156b have a protruding shape protruding from the upper surface of the protruding main body portion 56a in the laminating direction D. The deformation suppressing portion 156b is formed on the laminate 65 side of the protruding main body portion 56a in the width direction. That is, the deformation suppressing portion 156b is formed on the distal end side of the protruding main body portion 56a that protrudes with the upper end portion of the main body portion 55 as the base end. In the shown example, the deformation suppressing portion 156b having a substantially rectangular parallelepiped shape is formed on the laminate 65 side with respect to the center in the width direction of the protruding main body portion 56a. The plurality of deformation suppressing portions 156b are disposed apart from each other in the direction along the side on all four sides of the protruding main body portion 56a forming a rectangular shape.

In addition, a plurality of deformation suppressing portions 157b are disposed on the lower surface of the protruding main body portion 57a. The plurality of deformation suppressing portions 157b have a protruding shape protruding from the lower surface of the protruding main body portion 57a in the laminating direction D. The deformation suppressing portion 157b is formed on the laminate 65 side of the protruding main body portion 57a in the width direction. That is, the deformation suppressing portion 157b is formed on the distal end side of the protruding main body portion 57a that protrudes with the lower end portion of the main body portion 55 as the base end. In the shown example, the deformation suppressing portion 157b having a substantially rectangular parallelepiped shape is formed on the laminate 65 side with respect to the center in the width direction of the protruding main body portion 57a. The plurality of deformation suppressing portions 57b are disposed apart from each other in the direction along the side on all four sides of the protruding main body portion 57a forming a rectangular shape.

In the power storage module 12 adjacent to the laminating direction D, the deformation suppressing portion 157b of the upper power storage module 12 and the deformation suppressing portion 156b of the lower power storage module 12 abut each other when the laminate 65 expands due to use. That is, when viewed from the laminating direction D, the deformation suppressing portion 157b of the upper power storage module 12 and the deformation suppressing portion 156b of the lower power storage module 12 are disposed to overlap each other.

In the present modification example, the increase in the weight of the power storage module 12 can be suppressed by reducing the amount of a material of the second resin portion 154.

Figure 6:
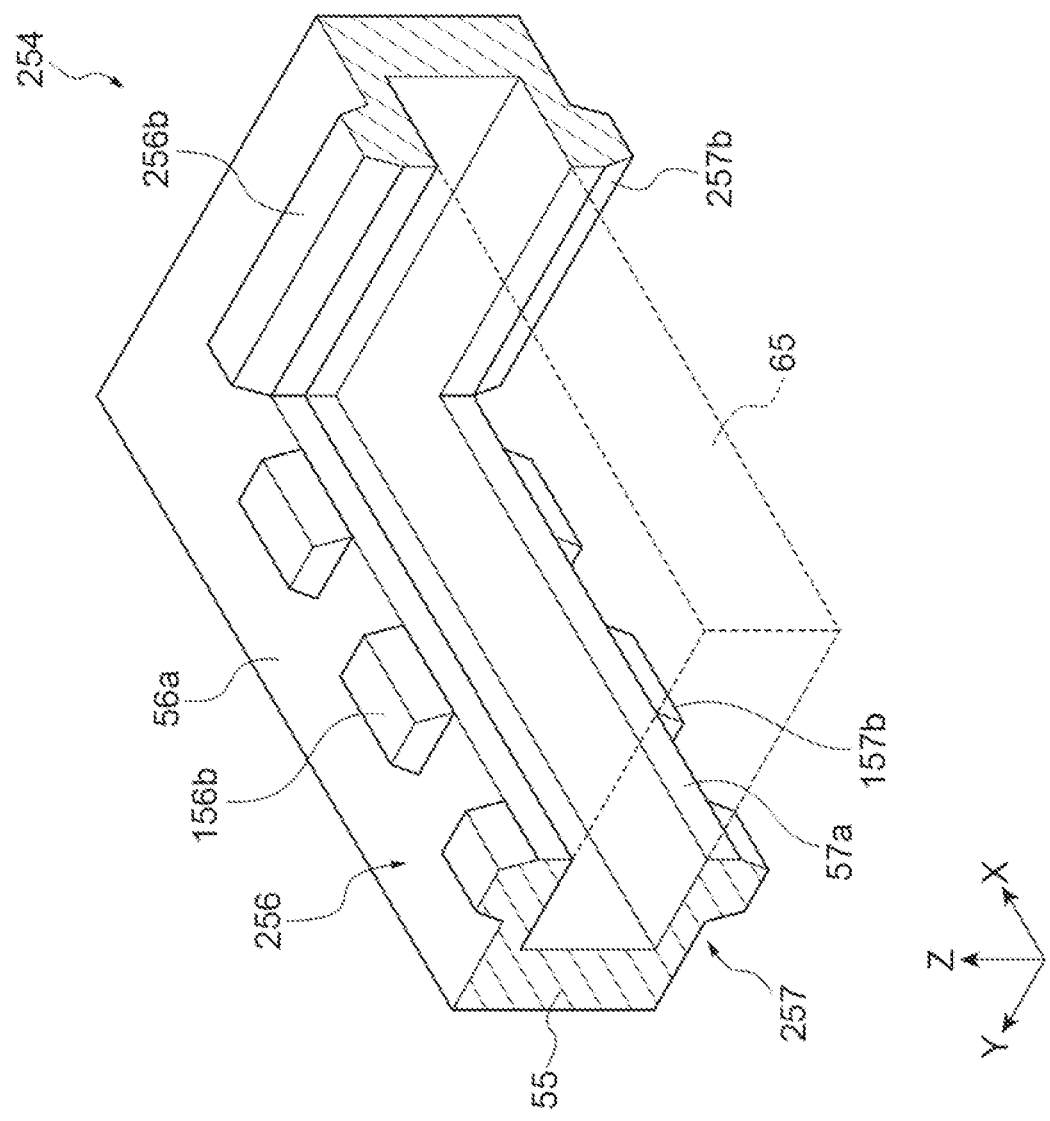
FIG. 6 is a cross-sectional perspective view explaining a sealed body.

In addition, FIG. 6 is a cross-sectional perspective view further explaining the second resin portion 254 of another example. The second resin portion 254 shown in FIG. 6 is partially different from the second resin portion 154 of the above-described modification example in terms of the shape of the deformation suppressing portion. The second resin portion 254 has the main body portion 55 and the protruding portions 256 and 257. The protruding portion 256 has the protruding main body portion 56a and the deformation suppressing portions 156b and 256b. A protruding portion 257 has the protruding main body portion 57a and deformation suppressing portions 157b and 257b. The form of the power storage module to which the second resin portion 254 is applied is the same as that of the power storage module 12 described above.

As shown in FIG. 1, the conductive plate 14 includes a plurality of through holes 14a that penetrate the conductive plate 14 in the Y direction (second direction). In this case, on the sides of the protruding, portions 256 and 257 extending along the X direction (third direction), the deformation suppressing portions 156b and 157b are disposed apart from each other in the X direction. On the other hand, on the sides of the protruding portions 256 and 257 extending along the Y direction, the deformation suppressing portions 256b and 257b are continuously formed from one end side to the other end side of the side. As an example, the deformation suppressing portions 256b and 257b are located closer to the laminate 65 side than the center in the width direction of the protruding main body portions 56a and 57a. A direction through which the through hole 14a penetrates may be a short side direction or a long side direction of the conductive plate 14 having a rectangular shape in a plan view.

The deformation suppressing portions 256b and 257b are continuously formed from one end side to the other end side in the direction along the through hole 14a. Therefore, when the laminate 65 expands, the deformation suppressing portions 256b and 257b firmly abut each other in a pair of second resin portions 254 adjacent to each other in the laminating direction. As a result, deformation of the protruding portions 256 and 257 can be suppressed more reliably. Further, the deformation suppressing portions 156b and 157b are disposed apart from each other in the direction intersecting the through hole 14a. Therefore, even when the deformation suppressing portions 156b and 157b adjacent to each other in the laminating direction abut each other, the through hole 14a is prevented from being completely blocked by the deformation suppressing portions 156b and 157b.

In each of the above-described examples, the configurations of each other can be diverted or added unless there is a contradiction or a problem.

For example, in the example shown in FIG. 3 and the example shown in FIG. 5, the deformation suppressing portions are shown to be disposed apart from each other in the direction of the side of the protruding main body portion, but the deformation suppressing portions may be continuously formed from one end side to the other end side of the side, as in the deformation suppressing portion 256b shown in FIG. 6.

Further, the deformation suppressing portion shown in FIG. 6 is located closer to the laminate side than the center in the width direction of the protruding main body portion, but the deformation suppressing portion may be formed from one end to the other end in the width direction of the protruding main body portion as in the deformation suppressing portion 56b shown in FIG. 3.

Furthermore, when the module is expanded, instead of the deformation suppressing portions, the deformation suppressing portion and the protruding portion main body may configured to abut each other.

REFERENCE SIGNS LIST

14: conductive plate
16: restraining member
32: bipolar electrode (electrode)
54: second resin portion (sealed body)
55: main body portion
56, 57: protruding portion
56b, 57b: deformation suppressing portion
65: laminate
D: laminating direction

The invention claimed is:

1. A power storage device comprising:
a plurality of power storage modules laminated in a first direction via a conductive plate, so that the conductive plate and the plurality of power storage modules overlap each other as viewed from the first direction, and wherein the conductive plate includes a through hole formed in a second direction intersecting the first direction, and the through hole is a cooling flow path through which cooling fluid passes;
wherein each of the plurality of power storage modules includes
a laminate including a plurality of bipolar electrodes laminated in the first direction, and a first terminal electrode and a second terminal electrode that are located at opposing ends of the laminate in the first direction,
each of the bipolar electrodes includes:
an electrode plate, a positive electrode provided on a first surface of the electrode plate, and a negative electrode provided on a second surface, opposite from the first surface, of the electrode plate,
wherein the first terminal electrode includes a first surface that faces the bipolar electrodes and a second surface that faces and connects to the conductive plate; and
a sealed body provided on a side surface of the laminate extending in the first direction,
the laminate has an electrode exposure portion exposed from the sealed body, wherein the electrode exposure portion is formed on the second surface of the first terminal electrode,
in a state of the plurality of power storage modules being laminated by disposing the conductive plate on the electrode exposure portion:
the laminate and the conductive plate are restrained in the first direction by a restraining member, and the conductive plate is smaller than the laminate as viewed from the first direction so that the conductive plate does not protrude from an outer periphery of the laminate as viewed from the first direction,
the conductive plate and the electrode exposure portion are located inside the sealed body as viewed from the first direction, and
the conductive plate, the positive electrode, and the negative electrode overlap each other as viewed from the first direction,
the sealed body includes
a main body portion covering the side surface of the laminate;
protruding portions protruding in a width direction intersecting the first direction with end portions of the main body portion in the first direction as base ends and covering peripheral edges of an upper surface and a bottom surface of the laminate; and
a plurality of deformation suppressing portions protruding from the protruding portions in the first direction, wherein the plurality of deformation suppressing portions are disposed apart from each other.

2. The power storage device according to claim 1, at least one of the plurality of deformation suppressing portions is formed from one end to the other end of one of the protruding portions in the width direction.

3. The power storage device according to claim 1, at least one of the plurality of deformation suppressing portions is formed on a distal end side of one of the protruding portions in the width direction.

4. The power storage device according to claim 1, wherein the protruding portions have a rectangular frame shape when viewed from the first direction, and on at least one side of the protruding portions constituting the rectangular frame shape, the plurality of deformation suppressing portions are disposed apart from each other in a direction along the side.

5. The power storage device according to claim 1, wherein the sealed body includes other deformation suppressing portions protruding from the protruding portions in the first direction, the other deformation suppressing portions are continuously formed from one end side to the other end side in the second direction on a side of the protruding portions extending along the second direction, and the plurality of the deformation suppressing portions are disposed apart from each other in a third direction intersecting the first direction and the second direction on a side of the protruding portions extending along the third direction.

6. The power storage device according to claim 1, wherein when at least one of a plurality of the laminates is expanded by use, at least one of the plurality of deformation suppressing portions of the at least one of the expanded laminates abuts on the protruding portion of the sealed body adjacent in the first direction, and when none of the plurality of laminates is expanded by use, none of the plurality of deformation suppressing portions abuts on the protruding portion of the sealed body adjacent in the first direction.

7. A power storage device comprising:
a plurality of power storage modules laminated in a first direction via a conductive plate, so that the conductive plate and the plurality of power storage modules overlap each other as viewed from the first direction, and wherein the conductive plate includes a through hole formed in a second direction intersecting the first direction, and the through hole is a cooling flow path through which cooling fluid passes,
wherein each of the plurality of power storage modules includes
a laminate including a plurality of bipolar electrodes laminated in the first direction, and first terminal electrode and a second terminal electrode that are located at opposing ends of the laminate in the first direction,
each of the bipolar electrodes includes:
an electrode plate, a positive electrode provided on a first surface of the electrode plate, and a negative electrode provided on a second surface, opposite from the first surface, of the electrode plate,
the first terminal electrode includes a first surface that faces the bipolar electrodes and a second surface that faces and connects to the conductive plate; and
a sealed body provided on a side surface of the laminate extending in the first direction,
the laminate has an electrode exposure portion exposed from the sealed body, wherein the electrode exposure portion is formed on the second surface of the first terminal electrode,
in a state of the plurality of power storage modules being laminated by disposing the conductive plate on the electrode exposure portion:
the laminate and the conductive plate are restrained in the first direction by a restraining member, and the conductive plate is smaller than the laminate as viewed from the first direction so that the conductive plate does not protrude from an outer periphery of the laminate as viewed from the first direction,
the conductive plate and the electrode exposure portion are located inside the sealed body as viewed from the first direction, and
the conductive plate, the positive electrode, and the negative electrode overlap each other as viewed from the first direction,
the sealed body includes
a main body portion covering the side surface of the laminate;
protruding portions protruding in a width direction intersecting the first direction with end portions of the main body portion in the first direction as base ends and covering peripheral edges of an upper surface and a bottom surface of the laminate; and
at least one deformation suppressing portion protruding from at least one of the protruding portions in the first direction, wherein the at least one deformation suppressing portion is formed on a distal end side of the at least one of the protruding portions in the width direction.

* * * * *